April 16, 1929. O. R. BLAZER 1,709,653
CONTROL SWITCH FOR DRIVING LIGHTS OF AUTOMOBILES
Filed March 3, 1927
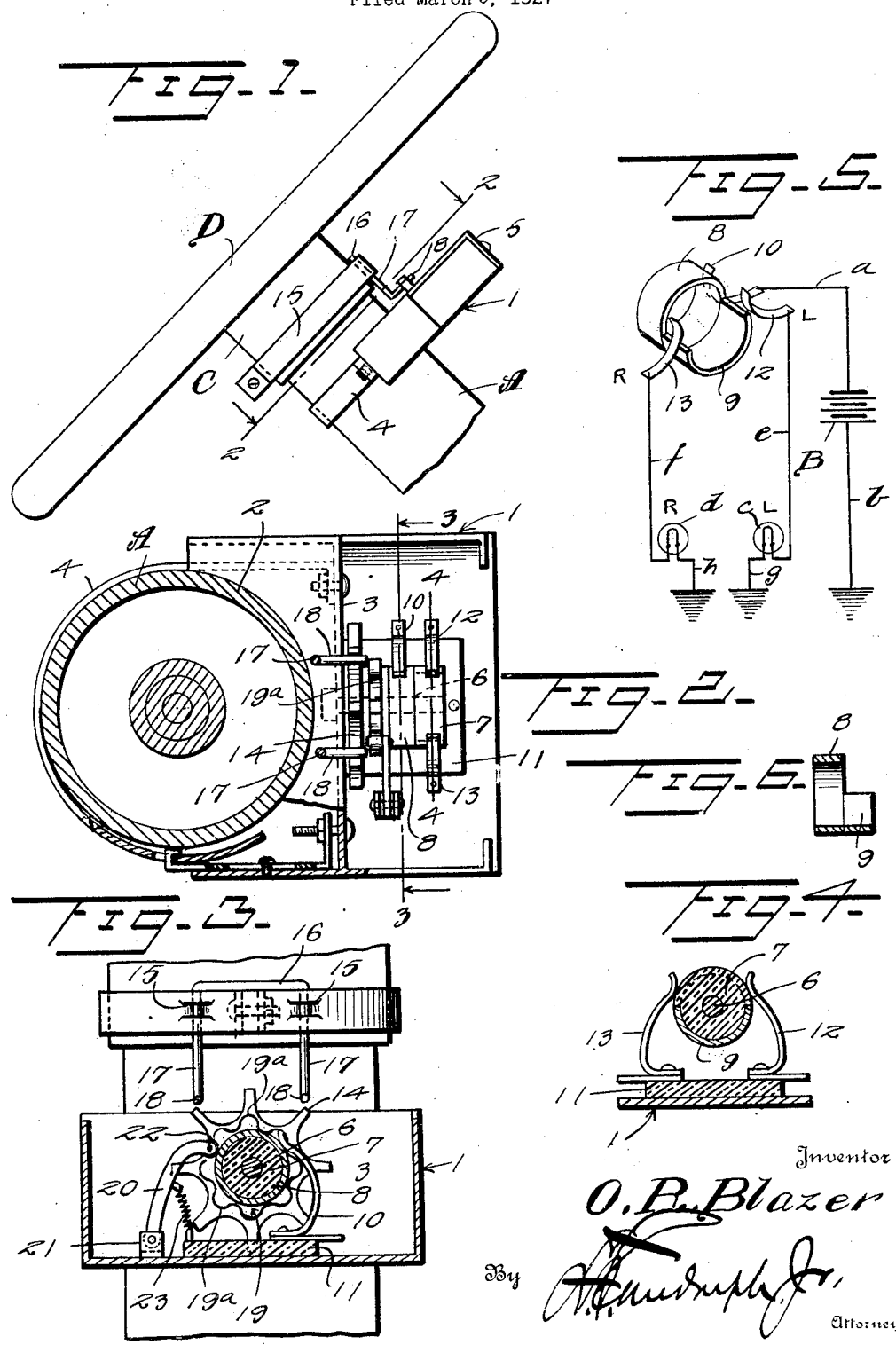

Patented Apr. 16, 1929.

1,709,653

UNITED STATES PATENT OFFICE.

OSCAR R. BLAZER, OF TURKEY KNOB, WEST VIRGINIA.

CONTROL SWITCH FOR DRIVING LIGHTS OF AUTOMOBILES.

Application filed March 3, 1927. Serial No. 172,380.

The invention relates to a switch to be mounted on the steering post of an automobile, and automatically operated by the rotation of the steering wheel to control the current from a battery or other source of power to the driving lights of an automobile so that in rounding curves the driving lights adjusted to throw the light beams at an angle to the course of the vehicle will be ignited to illuminate the road in advance of the vehicle in making the curve, there being provided two driving lights, one arranged to throw the light beams toward the right, and the other toward the left.

The invention has for its object the provision of a switch including a commutator having a contact ring engaged by a brush in circuit with one terminal of a battery or other source of power, and a segmental contact, and brushes adapted to engage said segmental contact, said brushes being in circuit with the driving lights to ignite the driving lamps to properly direct the beams in making turns, said brushes being normally out of contact with the segmental contact, but when the steering wheel is operated, the commutator is rotated to properly direct the circuit to the lamps to be ignited.

A further object of the invention is the provision of means by which the commutator may at all times be held in proper position for actuation, said means including a fluted gear and a spring actuated arm engaging the gear the convolutions of the gear corresponding to the points on a star wheel carried by the commutator that is actuable by arms on the steering wheel to rotate the commutator to direct the circuit to the lamps to be ignited.

The invention will be described in detail hereinafter and will be found illustrated in the accompanying drawings in which Figure 1 is a side view in elevation of a steering wheel and the attached end of the steering post showing the switch mounted thereon, Figure 2 is a transverse sectional view of the steering post substantially on a plane indicated by the line 2—2 of Figure 1, and showing the switch in plan and partly in section, the cover plate of the switch being removed, Figure 3 is a transverse sectional view on a plane indicated by the line 3—3 of Figure 2, Figure 4 is a sectional detail on a plane indicated by the line 4—4 of Figure 2, Figure 5 is a diagrammatic view of the wiring, and Figure 6 is a sectional detail of the contact members on the commutator.

In the drawings similar reference characters will be used to designate corresponding parts throughout the several views.

The improved switch comprises a casing 1 recessed as shown at 2 to snugly engage the steering post A, and having a transverse partition 3 to which is secured a clamping band 4 to hold the casing 1 in engagement with the steering post, 5 indicating a cover that removably engages the casing. A stub shaft 6 is supported by the partition 3 and journals a commutator 7 that is made of a non-conductor of electricity, 8 designating a contact ring of any suitable conductor, such for instance as brass or bronze, and 9 a segmental contact member that electrically engages the spring 8. A brush 10 secured to base 11 of a non-conductor of electricity is in engagement with the contact ring 8, and as shown in Figure 5 is connected to one of the terminals of the battery B by means of wire $a$ the other terminal of the battery being grounded by means of the wire $b$ on any suitable metallic part of the vehicle. 12 and 13 designate other brushes arranged to contact with the spring metal contact member 9 when the commutator is rotated by the instrumentalities to be hereinafter more specifically described, and are mounted on the base 11, and in circuit with the lamps $c$ and $d$ respectively by means of wires $e$ and $f$ respectively, said lamps being grounded by means of connections $g$ and $h$ on the metallic part of the vehicle in the usual manner of grounded circuit lamps.

Secured for rotation with the commutator 7 is star wheel 14. Mounted on the hub C of the steering wheel D is a clamping band 15 having secured thereto U-shaped member 16 the arms 17 of which have outwardly extending ends 18 that are adapted to engage the points of the star wheel 14 when the steering wheel D is turned in either direction to partially rotate the commutator 7 so that the segmental contact member 9 engages one or the other of the brushes 12, 13, to close the circuit to the battery B to disconnected lamp $c$ or $d$ as the case may be. A fluted gear 19 is also mounted for rotation with the commutator 7 and 20 designates an arm pivotally mounted between the ears 21 secured to the base of the casing 1, and having a laterally journaled roller 22 mounted on its free end and engaging the convulutions of the fluted roller 19. The ridges 19ᵃ of the fluted gear 19 are alined with the points of the star wheel 14, so that the roller 22 on the arm 20 that is pressed into engagement with the periphery of the fluted wheel 19 by means of the spring 23 curved to insure properly locating the points of the star wheel for engagement by the ends 18 of the arms 17 of the U-shaped member 16.

It will be apparent that as the casing 1 of the switch is held from rotation on the steering post A, that rotation of the steering wheel D and its hub C will carry with it the members 18 that will strike the projecting point of the star wheel 14 and turn the commutator either in a clockwise or counterclockwise direction governed by the rotation of the steering wheel D, and move the contact member 9 into engagement with one or the other of the brushes 12, 13, as heretofore described, and close the circuit to the driving lamp c or d that is adjusted to direct its rays to the right or to the left as the case may be to illuminate the roadway in advance of the vehicle. After the turn of the vehicle is completed the commutator will be moved to its original position by the engagement of the members 18 with the star wheel 14, the arm 20 carrying the roller 22 by engaging with the fluted gear 19 serving as a cam to insure completion of the movement of the commutator to its original position as the spring 23 will cause the arm to force the fluted gear into position so that the roller 22 will engage in a groove of the fluted gear when the commutator is in its original position.

What is claimed is:—

1. A switch, comprising a casing adapted to be secured to a stationary member, a commutator revolubly mounted in the casing, a contact ring on said commutator, a brush engaging said ring, a segmental contact on said commutator, brushes to selectively contact with said segmental contact, a star wheel operating with the commutator, a member rotatably engaging the stationary member, means carried by said rotatable member to engage the star wheel and actuate the commutator, a fluted gear carried by the commutator, and a spring actuated arm engaging said fluted gear to locate the points of the star wheel for actuation by said means.

2. A switch, comprising a casing adapted to be secured to a stationary member, a commutator revolubly mounted in the casing, a contact ring on said commutator, a brush engaging said ring, a segmental contact on said commutator, brushes to selectively contact with said segmental contact, a star wheel operating with the commutator, a member rotatably engaging the stationary member, arms carried by said rotatable member to engage the points of the star wheel to actuate it, a fluted gear having its convolutions corresponding to the points of the star wheel, a spring actuated arm, and a roller journaled on said arm and engaging said fluted gear to locate the star wheel for actuation by said arms.

In testimony whereof I affix my signature.

OSCAR R. BLAZER.